United States Patent
Shu et al.

(10) Patent No.: US 11,086,560 B2
(45) Date of Patent: Aug. 10, 2021

(54) DATA STORAGE ACCESS METHOD, DEVICE AND APPARATUS FOR PERSISTENT MEMORY

(71) Applicant: Tsinghua University, Beijing (CN)

(72) Inventors: Jiwu Shu, Beijing (CN); Youmin Chen, Beijing (CN); Bohong Zhu, Beijing (CN); Youyou Lu, Beijing (CN)

(73) Assignee: Tsinghua University, Beijing (CN)

( * ) Notice: Subject to any disclaimer, the term of this patent is extended or adjusted under 35 U.S.C. 154(b) by 127 days.

(21) Appl. No.: 16/553,276

(22) Filed: Aug. 28, 2019

(65) Prior Publication Data

US 2021/0011652 A1 Jan. 14, 2021

(30) Foreign Application Priority Data

Jul. 12, 2019 (CN) .......................... 201910631722.X

(51) Int. Cl.
*G06F 9/46* (2006.01)
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| 8,260,816 B1* | 9/2012 | Vaghani | G06F 17/00 707/791 |
| 2007/0288587 A1* | 12/2007 | Aguilera | G06F 9/526 709/214 |
| 2009/0073981 A1* | 3/2009 | Coyte | H04L 49/9078 370/392 |
| 2009/0254724 A1* | 10/2009 | Vertes | G06F 9/526 711/162 |
| 2009/0327575 A1* | 12/2009 | Durham | G06F 12/145 711/6 |

(Continued)

FOREIGN PATENT DOCUMENTS

| CN | 103268455 B | 12/2015 |
| CN | 108763508 B | 11/2018 |
| CN | 108965299 A | 12/2018 |

*Primary Examiner* — Ryan Bertram
*Assistant Examiner* — Trang K Ta

(57) ABSTRACT

The invention discloses a data storage access method, device and apparatus for persistent memory. The method includes: enabling a file system in device to receive, in a kernel space, an access request of a user library, where the user library operates in user mode, and the access request is initiated by third-party application through user library and carries operation type; if the operation type is read operation, enabling the file system to allow third-party application to directly access persistent memory space of device through user library; and if the operation type is not read operation, enabling the file system to allow third-party application to access persistent memory space of device through user library and kernel thread, where kernel thread operates in kernel mode. In this way, the present invention can achieve both high performance and data security of persistent memory, and provide technical support for scalability in multi-core scenario.

13 Claims, 7 Drawing Sheets

(56) References Cited

U.S. PATENT DOCUMENTS

| | | | | |
|---|---|---|---|---|
| 2013/0132627 A1* | 5/2013 | Dong | ............... | G06F 9/545 |
| | | | | 710/200 |
| 2013/0346718 A1* | 12/2013 | Meshchaninov | ..... | G06F 12/109 |
| | | | | 711/164 |
| 2015/0242254 A1* | 8/2015 | Kim | ............... | G06F 13/1663 |
| | | | | 711/151 |
| 2018/0121371 A1* | 5/2018 | Lillibridge | ............... | G06F 9/50 |
| 2019/0306282 A1* | 10/2019 | Masputra | ............... | H04L 69/161 |

\* cited by examiner

DATA STORAGE ACCESS METHOD, DEVICE AND APPARATUS FOR PERSISTENT MEMORY

CROSS-REFERENCE TO RELATED APPLICATIONS

This application claims the benefit of priority from Chinese Patent Application No. CN 201910631722.X, filed on Jul. 12, 2019. The content of the aforementioned application, including any intervening amendments thereto, is incorporated herein by reference in its entirety.

TECHNICAL FIELD

The present invention relates to the field of persistent memory storage technologies, and in particular, to a data storage access method for persistent memory, a data storage access device for persistent memory, and an apparatus with storage function.

BACKGROUND OF THE PRESENT INVENTION

Persistent memory (PM) is a new type of storage class memory with byte-addressability. Persistent memory features low read and write latency, high bandwidth, data persistence, and low power consumption. Persistent memory not only has a read and write performance similar to Dynamic Random Access Memory (DRAM), but also provides persistence similar to external storage such as traditional disk. In view of high-performance storage devices and the growing multi-core processor architecture, it is important to build efficient file systems that fully utilize the performance of persistent memory.

In one scheme of the prior art, a part of the file system is placed in the kernel in a conventional manner, and data protection can be provided in case of arbitrary write operation. The communication between the kernel mode and the user mode is implemented though system calls. The virtual file system (VFS) as an abstract layer can shield the implementation details of the file system and provide a unified file access interface. Another scheme proposes to design a persistent memory file system in user mode that fully uses the benefit of direct access by using a design bypassing the operating system. Yet another scheme proposes to use a trusted component to coordinate critical updates to the file system.

The inventor(s) of the present application found in the long-term development that simply placing the file system completely in the kernel mode or the user mode makes the high performance and write protection of the persistent memory become conflicting and difficult to be implemented at the same time; and component design inevitably limits the scalability of persistent memory in multicore scenarios.

SUMMARY OF THE PRESENT INVENTION

The technical problem to be solved by the present invention is to provide a data storage access method for persistent memory, a data storage access device for persistent memory and an apparatus with storage function capable of achieving both high performance and data protection of persistent memory and providing technical support for scalability in multi-core scenarios.

In order to solve the above technical problem, a technical solution adopted by the present invention is to provide a data storage access method for persistent memory, the method including: enabling a file system in a device to receive, in a kernel space, an access request of a user library, where the user library operates in a user mode, and the access request is initiated by a third-party application through the user library and carries an operation type; if the operation type is read operation, enabling the file system to allow the third-party application to directly access a persistent memory space of the device through the user library; and if the operation type is not read operation, enabling the file system to allow the third-party application to access the persistent memory space of the device through the user library and a kernel thread, where the kernel thread operates in a kernel mode.

Prior to enabling the file system in the device to receive, in the kernel space, the access request of the user library, the method includes: mapping the persistent memory space of the device to a user space in a read-only mode.

If the operation type is read operation, the enabling the file system to allow the third-party application to directly access persistent memory space of the device through the user library includes: for the read operation, enabling the file system to allow the third-party application to directly index a file system image in the user space through the user library.

The user library communicates with the kernel thread through a shared message pool; the shared message pool is a shared memory area for messages which is used by the user library and the kernel thread in common.

The method further includes: enabling a plurality of the user libraries to send a plurality of different access requests to the kernel thread through the shared message pool; enabling the kernel thread to process the plurality of different access requests in a batch, and adding a corresponding log-structured metadata modification history in a batch, where the log-structured metadata modification history is adapted to record information related to modified metadata and is stored in the persistent memory space; and after processing the plurality of different access requests, enabling the kernel thread to return processing results to the user libraries through the shared message pool in a batch.

The method further includes: enabling the user libraries to apply message areas for their processes in the shared message pool during initialization, where message areas for different processes are isolated from each other, and each process is only allowed to access the message area of its own; enabling the user libraries to copy new messages to the message areas and set request status fields to validate the new messages; enabling the kernel thread to identify the validated new messages in a polling manner; enabling the kernel thread to copy corresponding return information to the message areas and set message return values after finishing processing of the validated new messages; and enabling the user libraries to query the message return values in a polling manner to obtain the return information.

The operation type that is not a read operation is at least one of a write operation and a modification operation.

If the operation type is not a read operation, the enabling the file system to allow the third party application to access the persistent memory space of the device through the user library and the kernel thread includes: for the write operation, enabling the kernel thread to set a first page entry of a page table in the kernel space to make a corresponding first data page writable, where the first data page is a memory area of fixed size in the persistent memory space; enabling the user library to complete the write operation on the first data page; and enabling the kernel thread to reset the first page entry to make the first data page read-only.

The method further includes: enabling the kernel thread to reserve a second data page for the user library in a batch and set an associated second page entry to make the second data page writable, where the second data page is a memory area of fixed size in the persistent memory space;

where, if the operation type is not a read operation, the enabling the file system to allow the third party application to access the persistent memory space of the device through the user library and the kernel thread includes: for the write operation, enabling the user library to directly perform allocation in the reserved second data page and obtain a corresponding range lock directly in the user space; enabling the user library to complete the write operation on the allocated second data page; and enabling the kernel thread to reset the second page entry of the newly written second data page as read-only and release the range lock.

The range lock is capable of supporting concurrent write operations in a same file; the enabling the user library to complete the write operation on the allocated second data page includes: enabling the file system to allocate a lock queue to each opened file; enabling the user library that initiates requests for writing to a same file to traverse all write operation fields in the lock queue before the write operations; if it is determined that all the write operation fields added before are different from the write operation field of its own, adding the write operation field of its own to the lock queue, and enabling the user library to complete the write operation on the allocated second data page, where the write operation field is adapted to record a range of file offsets involved in the write operation; and if it is determined that one of the write operation fields added before overlaps with the write operation field of its own, enabling the user library to complete the write operation on the allocated second data page after a previous write operation is completed.

If the operation type is not a read operation, the enabling the file system to allow the third party application to access the persistent memory space of the device through the user library and the kernel thread includes: for a modification operation, enabling the user library to send a modification request to the kernel thread, and enabling the kernel thread to perform corresponding modification according to the modification request.

Data of the file system includes indexable structured metadata being stored in a dynamic random access memory DRAM; data of the file system further includes a log-structured metadata modification history, where the log-structured metadata modification history is used to record related information of modified metadata and is stored in the persistent memory space; the modification operation is to modify the indexable structured metadata, and the method further includes: enabling the kernel thread to firstly add information about modifying of the indexable structured metadata to the log-structured metadata modification history when modifying the indexable structured metadata; and after the information about modifying of the indexable structured metadata reaches the persistent memory space, enabling the kernel thread to modify the indexable structured metadata in the DRAM.

The indexable structured metadata includes namespace metadata and data block index metadata, the namespace metadata is used to manage a namespace of the file system and forms a directory of the file system; the method further includes: enabling the kernel thread to maintain entries of the directory by using a skip list; and enabling the kernel thread to atomically modify node pointers of respective layers of the skip list by using atomic operation.

The method further includes: mapping an area of the DRAM that stores the indexable structured metadata to the user space in a read-only mode; before sending a modification request, enabling the user library to query, in the user mode, the nodes of respective skip lists corresponding to the entries to be updated in the namespace metadata, and carry address information of the nodes of the respective skip lists in the modification request; and enabling the kernel thread to quickly look for nodes of the skip lists to be modified by using the address information carried in the modification request and complete the modification operation on the metadata.

Metadata of the file system includes indexable structured metadata, and the indexable structured metadata is stored in a dynamic random access memory DRAM; the method further includes: mapping an area of the DRAM that stores the indexable structured metadata to the user space in a read-only mode; for the read operation, enabling the user library to look up through the indexable structured metadata in a read-only mode, and copy data read from corresponding data page to a data buffer of the third party application through a lock-free mechanism.

In order to solve the above technical problem, another technical solution adopted by the present invention is to provide a data storage access device for persistent memory, the device including a processor, a storage, and a communication circuit, where the processor is coupled to the storage and the communication circuit, the storage includes a persistent memory and a dynamic random access memory, and the processor, the memory and the communication circuit are capable of implementing steps of any method as described above while in operation.

In order to solve the above technical problem, another technical solution adopted by the present invention is to provide an apparatus with storage function on which program data is stored, where the program data, when being executed by a processor, implements steps of any method as described above.

The beneficial effects of the present invention are as follows. Different from the prior art, in the data storage access method for persistent memory of the present invention, the file system includes a user library operating in a user mode and a kernel thread operating in a kernel mode, a user's third-party application can initiate an access request through the user library. If the access request is a read operation, the user's third-party application can directly access persistent memory space of the device through the user library, thereby ensuring read performance of the persistent memory space; if the access request is not a read operation (such as a write operation, a modification operation, etc.), the user's third-party application can access the persistent memory space of the device through the user library (in user mode) and the kernel thread (in kernel mode), in which the user library and the kernel thread are in their own normal operation states and there is no need to switch between the operation states with the user library and the kernel thread being able to communicate with each other. In this way, the non-reading (for example, writing, modifying, etc.) performance of the persistent memory space can be guaranteed. At the same time, the kernel thread in kernel mode may refuse unsafe access request to ensure access protection while guaranteeing the non-reading performance of the persistent memory space; user library can be added depending on practical applications, to provide technical support for the scalability in multicore scenarios.

BRIEF DESCRIPTION OF THE DRAWINGS

For clearer illustration of the technical solutions in the embodiments of the present application, drawings used in the description of the embodiments will be briefly described below. It is obvious that the drawings in the following description are only some embodiments of the present application. Other drawings may also be obtained by those of ordinary skill in the art in light of these drawings without inventive labor. In the drawings.

DETAILED DESCRIPTION OF THE PRESENT INVENTION

Figure 1:
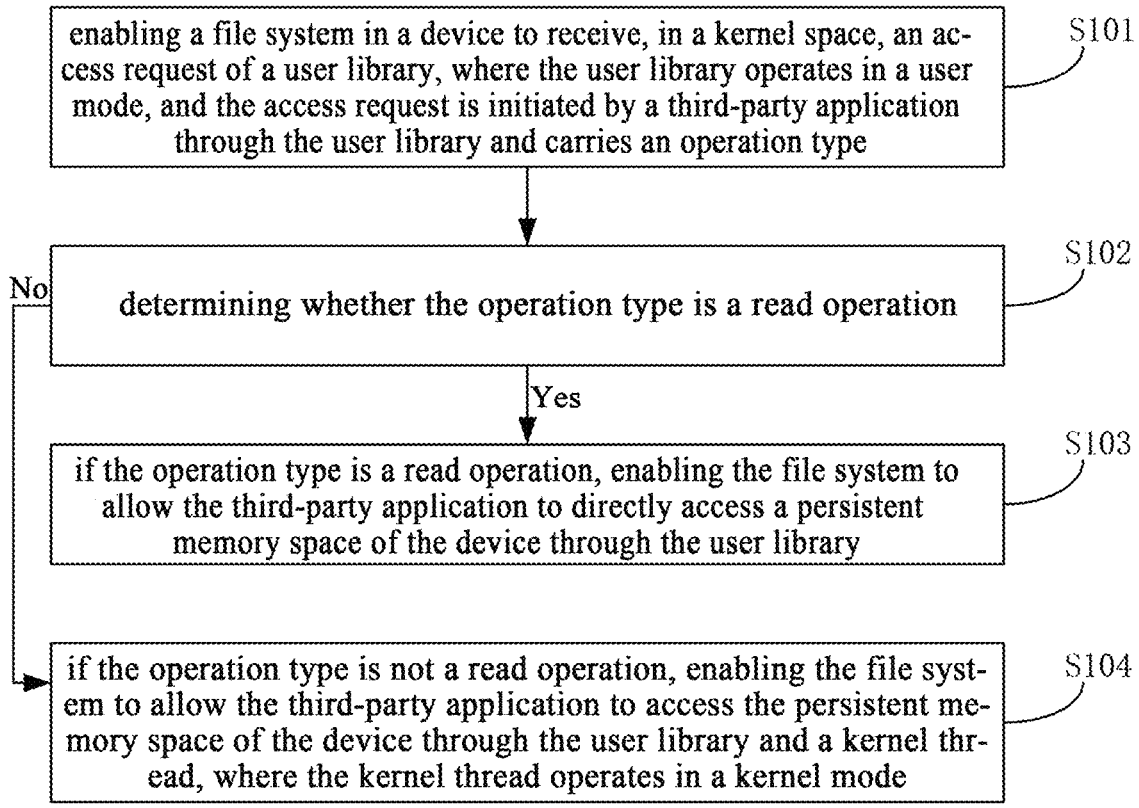
FIG. 1 is a schematic flow chart of an embodiment of a data storage access method for persistent memory according to the present invention.

The technical solutions in the embodiments of the present application are clearly and completely described in the following with reference to the drawings in the embodiments of the present application. It is obvious that the described embodiments are only some rather than all of the embodiments of the present application. All other embodiments obtained by a person of ordinary skill in the art based on the embodiments of the present application without creative labor fall in the scope of the present application.

Before describing the present invention in detail, the prior art related to the present invention will be briefly described.

Persistent memory (PM) is a new type of storage class memory with byte-addressability, such as phase change memory (PCM), spin-torque transfer RAM (STT-RAM), resistive RAM (RRAM) and the latest Intel Optane DC persistent memory. Persistent memory features low read and write latency, high bandwidth, data persistence, and low power consumption. Persistent memory not only has a read and write performance similar to Dynamic Random Access Memory (DRAM), but also provides persistence similar to external storage such as traditional disk. In view of high-performance storage devices and the growing multi-core processor architecture, it is important to build efficient file systems that fully utilize the performance of persistent memory.

For a long time, file systems are placed in the kernel as part of the operating system, providing data protection in case of arbitrary write operation. Usually, system calls are used for communication between kernel mode and user mode. Virtual File System (VFS) as an abstract layer can shield the implementation details of the file system, thus providing a unified file access interface. However, both system calls and VFS bring non-negligible software overhead, and virtual file system does not work well on multi-core platforms. System calls require context switching between kernel mode and user mode. This overhead is not negligible in the case of high-speed storage devices such as persistent memory. In view of similar performance between persistent memory and DRAM, the various caching mechanisms in VFS become less efficient, and the concurrency control mechanism of VFS itself is difficult to expand in a multi-core environment.

Some existing designs propose to design a persistent memory file system in user mode and utilize the design of bypassing the operating system to fully exploit the benefit of direct access. However, when persistent memory is imported into user space, unrestricted access by one program is likely to destroy the entire file system. In response to this problem, some designs propose to use a trusted component to coordinate these critical updates to the file system, but component design inevitably limits the scalability in multi-core scenarios.

The design of simply placing the file system completely in kernel mode or in user mode causes conflict between the high performance and write protection of persistent memory and it is difficult to implement the both at the same time. In the case of not changing the existing VFS architecture, the limited scalability makes it difficult to take full advantage of the superior performance of persistent memory under multi-core condition.

In the data storage access method for persistent memory of the present invention, the file system includes a user library operating in a user mode and a kernel thread operating in a kernel mode, and a user's third-party application can initiate an access request through the user library. If the access request is a read operation, the user's third-party application can directly access persistent memory space of the device through the user library, thereby ensuring read performance of the persistent memory space; if the access request is not a read operation (such as a write operation, a modification operation, etc.), the user's third-party application can access the persistent memory space of the device through the user library (in user mode) and the kernel thread (in kernel mode), in which the user library and the kernel thread are in their own normal operation states and there is no need to switch between the operation states with the user library and the kernel thread being able to communicate with each other. In this way, the non-reading (for example, writing, modifying, etc.) performance of the persistent memory space can be guaranteed. At the same time, the kernel thread in kernel mode may refuse unsafe access request to ensure access integrity while guaranteeing the non-reading performance of the persistent memory space; user library can be added depending on practical applications, to provide technical support for the scalability in multicore scenarios. In summary, in the data access method of the present invention, the kernel mode (kernel thread) and the user mode (user library) form a file system (a file system for persistent memory) with complementary advantages, collaborative cooperation and efficient design, which utilizes advantages of direct access in user mode (user library) and at the same time ensures the security of the file system by using the kernel mode (kernel thread).

The technical solutions in the embodiments of the present invention will be clearly and completely described in the following with reference to the drawings.

Referring to FIG. 1, FIG. 1 is a schematic flowchart of an embodiment of a data storage access method for persistent memory according to the present invention. The method includes:

Step S101: enabling a file system in a device to receive, in a kernel space, an access request of a user library, where the user library operates in a user mode, and the access request is initiated by a third-party application through the user library and carries an operation type;

Step S102: determining whether the operation type is a read operation;

Step S103: if the operation type is a read operation, enabling the file system to allow the third-party application to directly access a persistent memory space of the device through the user library; and Step S104: if the operation type is not a read operation, enabling the file system to allow the third-party application to access the persistent memory space of the device through the user library and a kernel thread, where the kernel thread operates in a kernel mode.

In the embodiment of the present invention, the file system includes a user library and a kernel thread, where the user library operates in a user mode, the kernel thread operates in a kernel mode, and the user library and the kernel thread can communicate with each other. The role of the user library is mainly to provide an access interface to the file system for user's third-party application(s). The user library can be added or established, and user libraries can be added or established for third-party applications of different users, which provides technical support for scalability in the multi-core scenario. The role of the kernel thread is mainly to handle user access requests, maintain data of the file system, and manage persistent memory space. The user library and the kernel thread can communicate with each other, and the communication between the user library and the kernel thread can be implemented in a way of connecting the kernel mode and the user mode through traditional system calls, or in a way of connecting the kernel mode and the user mode bypassing traditional system calls.

The user's third-party application can initiate an access request through the user library. If the access request is a read operation, the user's third-party application can directly access the persistent memory space of the device through the user library, thereby ensuring read performance of the persistent memory space; if the access request is not a read operation (such as a write operation, a modification operation, etc.), the user's third-party application can access the persistent memory space of the device through the user library (user mode) and kernel thread (kernel mode), in which the user library and the kernel thread are in their own normal operation states and there is no need to switch between the operation states with the user library and the kernel thread being able to communicate with each other. In this way, the non-reading (for example, writing, modifying, etc.) performance of the persistent memory space can be guaranteed. At the same time, the kernel thread in kernel mode may refuse unsafe access request to ensure access security while guaranteeing the non-reading performance of the persistent memory space.

In a practical implementation, a third-party application directly accesses the persistent memory space of the device by linking to the user library.

In an embodiment, prior to step S101, the method may include: mapping the persistent memory space of the device to a user space in a read-only mode. At this time, step S103 may be: for the read operation, enabling the file system to allow the third-party application to directly index a file system image in the user space through the user library.

In the read-only mode, data can only be read, and other non-read operations such as writing, modifying, and the like cannot be performed on the data.

Figure 2:
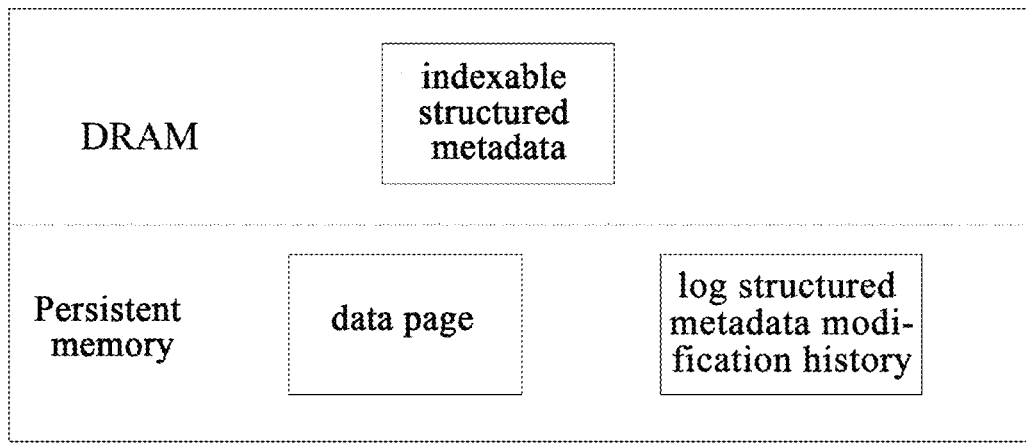
FIG. 2 is a schematic structural diagram of an embodiment of a file system image.

In one embodiment of the present invention, the file system image is a collection of data and metadata managed by the file system. Referring to FIG. 2, FIG. 2 is a schematic structural diagram of an embodiment of a file system image. The data and metadata managed by the file system exist in two types of media: DRAM and persistent memory. The DRAM is used to temporarily store indexable structured metadata in the file system. The indexable structured metadata is mapped to the user space in a read-only mode, and the user library can query the indexable structured metadata. Persistent memory is used to persistently store the data of the file system and metadata modification history with a log structure. The data page is a persistent memory area with a fixed-size for storing data, and the log structure records information of modified metadata.

In an embodiment, the user library communicates with the kernel thread through a shared message pool; the shared message pool can bypass the traditional system calls while connect the kernel mode and the user mode, and realize communication between the kernel thread and the user library, providing technical support for scalability (batch processing of kernel threads, concurrent write operations, etc.) in multi-core scenario.

The shared message pool is a shared memory area for messages which is used by the user library and the kernel thread in common. In an application, the shared message pool is built into DRAM and can be mapped to user space via the system call "mmap". The shared message pool can be divided into multiple small message areas, each of which is used independently by one process, and the processes do not share their respective message areas to enforce isolation. The communication mechanism between the kernel mode and the user mode is as follows: the user mode sends a request by copying it into the shared message pool; the kernel thread scans the shared message pool to receive the request and processes the request, and finally returns the processing result to the user mode.

Figure 3:
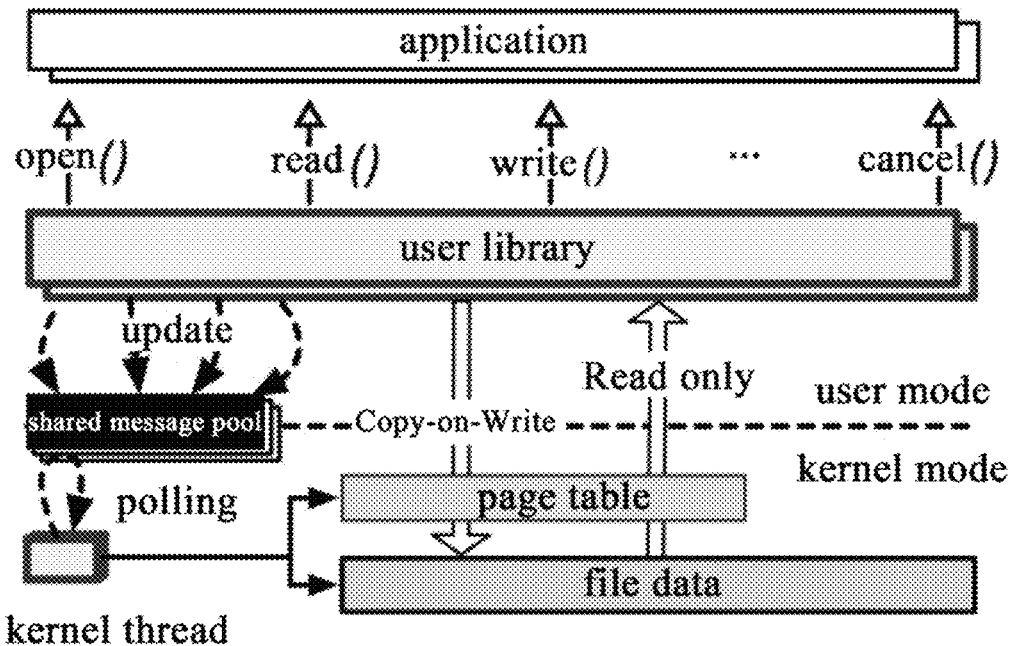
FIG. 3 is a schematic structural diagram of an embodiment of a file system in a data storage access method for persistent memory according to the present invention.

Referring to FIG. 3, FIG. 3 is a schematic structural diagram of an embodiment of a file system in a data storage access method for persistent memory according to the present invention.

Persistent memory is a new type of storage system with byte-addressability similar to DRAM while providing data persistence. The file system in the embodiment of the present invention is a file system built on persistent memory, and the file system uses the persistent memory as a data storage device. Persistent memory space is mapped to user space in read-only mode through the system call "mmap". A file system consists of two components: a user library and a kernel thread. The user library operates in user mode, and the kernel thread operates in kernel mode. The user library provides a file system access interface for user's third-party application(s) upwardly, and communicates with the kernel thread downwardly through the shared message pool. The kernel thread receives the user access request from the shared message pool, processes the access request, and returns the result to the user through the shared message pool.

Figure 4:
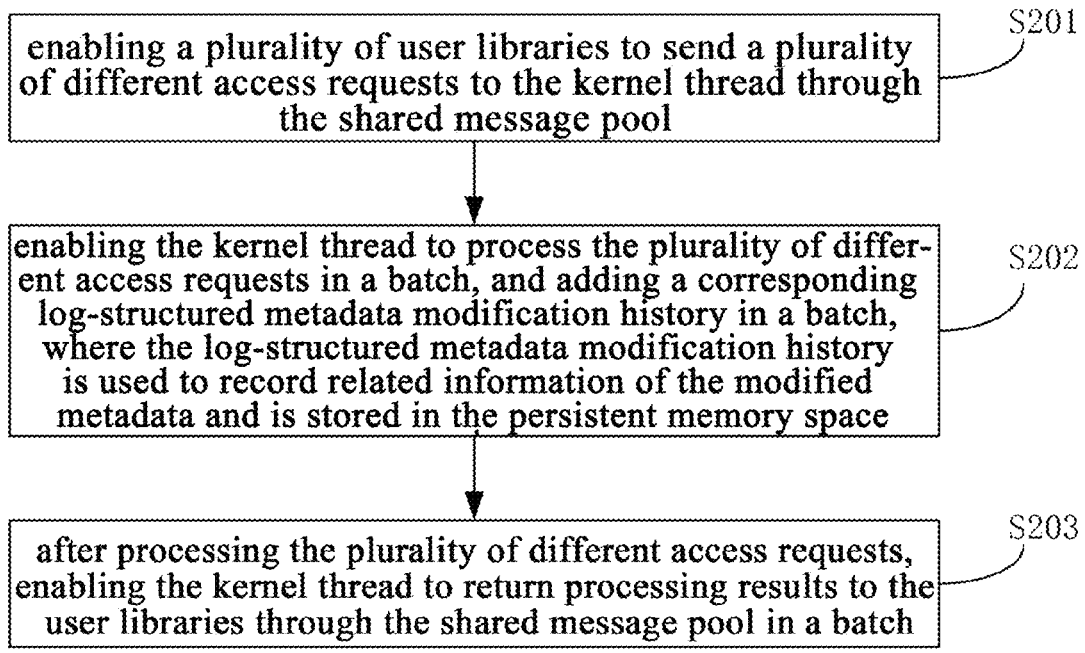
FIG. 4 is a schematic flow chart of another embodiment of a data storage access method for persistent memory of the present invention.

Referring to FIG. 4, in an embodiment, a method of kernel thread batch processing may specifically include:

Step S201: enabling a plurality of user libraries to send a plurality of different access requests to the kernel thread through the shared message pool;

Step S202: enabling the kernel thread to process the plurality of different access requests in a batch, and adding a corresponding log-structured metadata modification history in a batch, where the log-structured metadata modification history is used to record related information of the modified metadata and is stored in the persistent memory space; and Step S203: after processing the plurality of different access requests, enabling the kernel thread to return processing results to the user libraries through the shared message pool in a batch.

The method further includes: enabling the user libraries to apply message areas for their processes in the shared message pool during initialization, where message areas of different processes are isolated from each other, and each process can only access the message area of its own. The user library and the kernel thread communicate with each other through the message area according to a predefined communication protocol. In the communication, the user libraries initiate the requests, and the kernel thread is in the polling state; when new requests are received, the requests are processed and the results are returned to the user libraries; and after sending the requests, the user libraries view processing status of the requests by polling.

Figure 5:
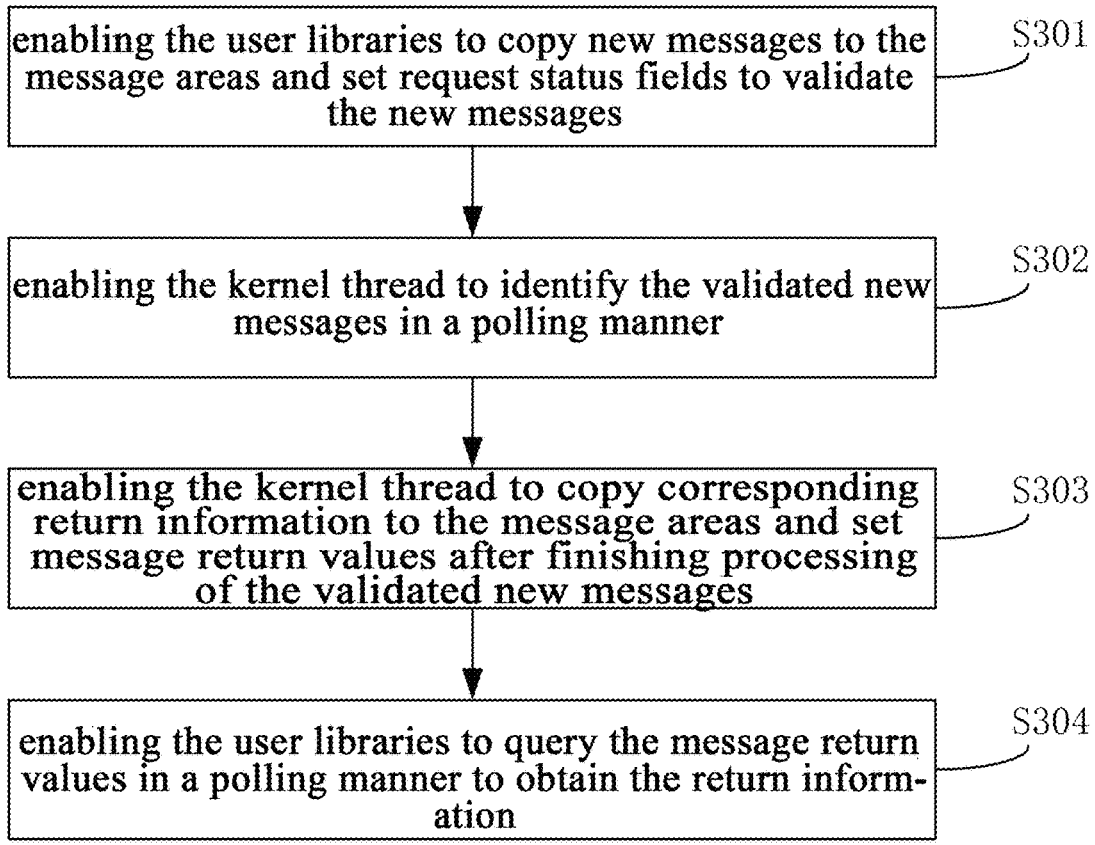
FIG. 5 is a schematic flow chart of still another embodiment of a data storage access method for persistent memory according to the present invention.

Specifically, based on the foregoing technology, referring to FIG. 5, the method further includes:

Step S301: enabling the user libraries to copy new messages to the message areas and set request status fields to validate the new messages;

Step S302: enabling the kernel thread to identify the validated new messages in a polling manner;

Step S303: enabling the kernel thread to copy corresponding return information to the message areas and set message return values after finishing processing of the validated new messages; and Step S304: enabling the user libraries to query the message return values in a polling manner to obtain the return information.

In an embodiment, an operation, that is not a read operation, is at least one of a write operation and a modification operation. Of course, an operation that is not a read operation may also include a copy operation, a delete operation, and the like.

Figure 6:
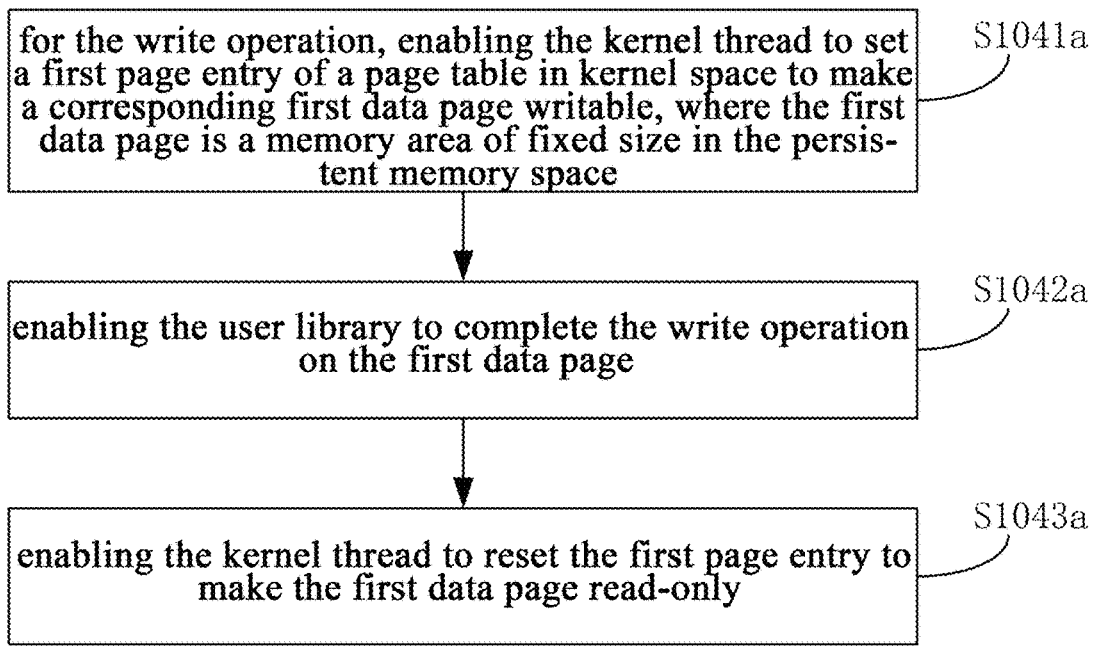
FIG. 6 is a schematic flow chart of still another embodiment of a data storage access method for persistent memory according to the present invention.

Referring to FIG. 6, when the operation is a write operation, such as a write operation for only once, a write operation with small quantity of content, and a circumstance of less write requests, step S104 may specifically include sub-step S1041a, sub-step S1042a, and sub-step S1043a.

Sub-step S1041a: for the write operation, enabling the kernel thread to set a first page entry of a page table in kernel space to make a corresponding first data page writable, where the first data page is a memory area of fixed size in the persistent memory space;

Sub-step S1042a: enabling the user library to complete the write operation on the first data page; and Sub-step S1043a: enabling the kernel thread to reset the first page entry to make the first data page read-only.

The first data page is a memory area of fixed-size in the persistent memory space. The three steps of making the first data page writable by the kernel thread, completing the write operation on the first data page by the user library, and resetting the first data page as read-only by the kernel thread are executed consecutively, that is, the first data page is not a writable data page that is reserved in advance by the kernel thread in batch. The communication between the user library and the kernel thread may be in the above-mentioned conventional manner, or may be in the manner of using the shared message pool as described above.

When the write operation takes a long time, makes with a large quantity of content, and the number of users is large, in order to save the operation time and to provide a technical basis for concurrent writing, in an embodiment, before the access request of the write operation is received, the kernel thread can reserve a second data page in advance in a batch. That is, the kernel thread reserves a free second data page for the user library in advance. During the write operation, the user library can use a part of the second data page, and the user library can retain the unused part of the second data page for the next write operation. When the kernel thread reserves the second data page in advance in a batch, the page entry corresponding to the second data page is set to a "writable" status at the same time. After the write operation of the user library is completed, the kernel thread manipulates the page entry again to restore read-only access of the user library to corresponding area.

Specifically, the method may further include: enabling the kernel thread to reserve the second data page for the user library in a batch and set an associated second page entry to make the second data page writable, where the second data page is a memory area of fixed size in the persistent memory space; in this case, step S104 may specifically include:

(1) for the write operation, enabling the user library to directly perform allocation in the reserved second data page;

(2) enabling the user library to complete the write operation on the allocated second data page; and (3) enabling the kernel thread to reset the second page entry of the newly written second data page as read-only.

The second data page refers to a memory area of fixed-size in the persistent memory space. The second data page is preset as writable by the kernel thread in batch before the write operation, that is, the second data page is reserved in advance by the kernel thread in batch as writable data page. The communication between the user library and the kernel thread may be in the above-mentioned conventional manner, or may be in the manner of using the shared message pool as described above.

In a write operation for once, the user tends to only update one area of the file, and other areas of the file are not affected. However, traditional file-grained lock will lock the entire file, and concurrent write is impossible even though two threads write different parts of the file. In view of this problem and to provide finer grained concurrency, the user library can obtain the range lock of the file in the user mode for concurrent write of the file.

Figure 7:
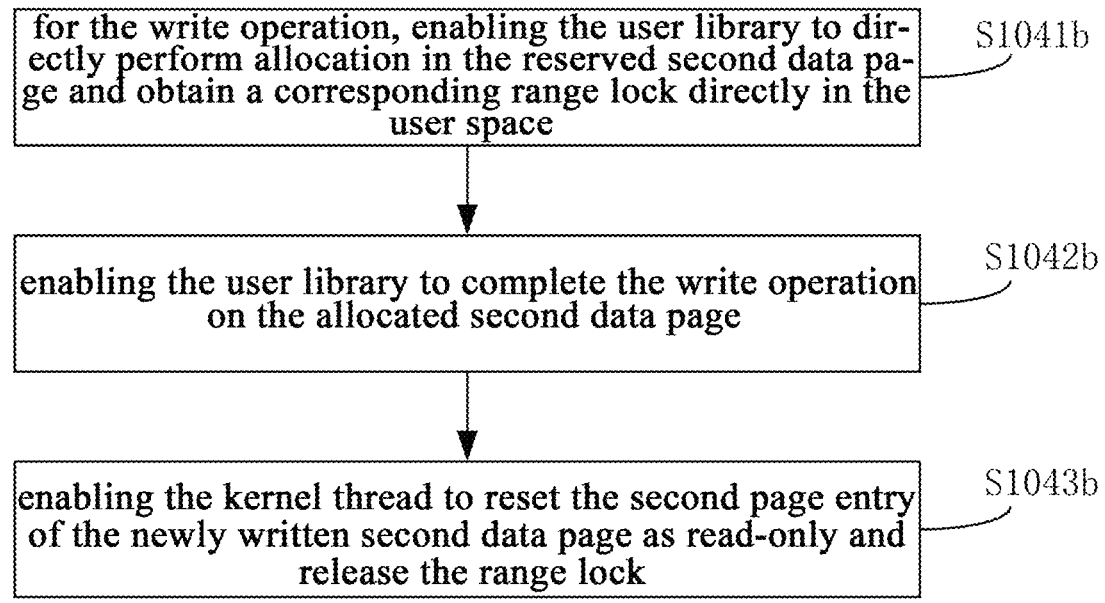
FIG. 7 is a schematic flow chart of still another embodiment of a data storage access method for persistent memory of the present invention.

In this case, referring to FIG. 7, step S104 may specifically include:

Sub-step S1041b: for the write operation, enabling the user library to directly perform allocation in the reserved second data page and obtain a corresponding range lock directly in the user space;

Sub-step S1042b: enabling the user library to complete the write operation on the allocated second data page; and Sub-step S1043b: enabling the kernel thread to reset the second page entry of the newly written second data page as read-only and release the range lock.

Figure 8:
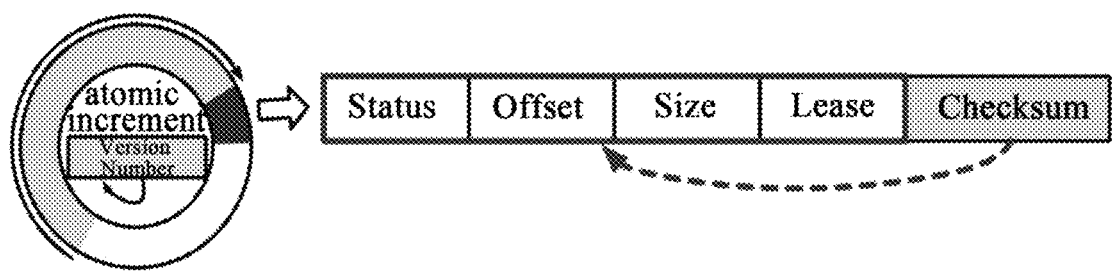
FIG. 8 is a schematic structural diagram of an embodiment of a range lock in a data storage access method for persistent memory according to the present invention.

FIG. 8 is a schematic structural diagram of an embodiment of a range lock in a data storage access method for persistent memory according to the present invention. The range lock includes a lock status (corresponding to the status in the drawing), a file offset (corresponding to the offset in the drawing), a data quantity to be written (corresponding to the size in the drawing), a lease, and a checksum. The field of lock status is used to identify whether the range lock is validated. When the user library obtains the range lock, the lock status is valid; and when the user library completes the write operation, the lock status is set to invalid. The field of file offset is used to indicate the starting offset of the file area affected by this write operation. The field of data quantity to be written is used to identify the amount of data that needs to be written in this write operation, and this field, together with the field of file offset, can identify the range of file offsets affected by this write operation. The field of lease is used to prevent the protection system from entering the deadlock status when the user has terminated but has not released the range lock yet. The checksum is derived by hashing the foregoing four fields, and the checksum is used to prevent malicious programs from attacking the range lock structure.

Figure 9:
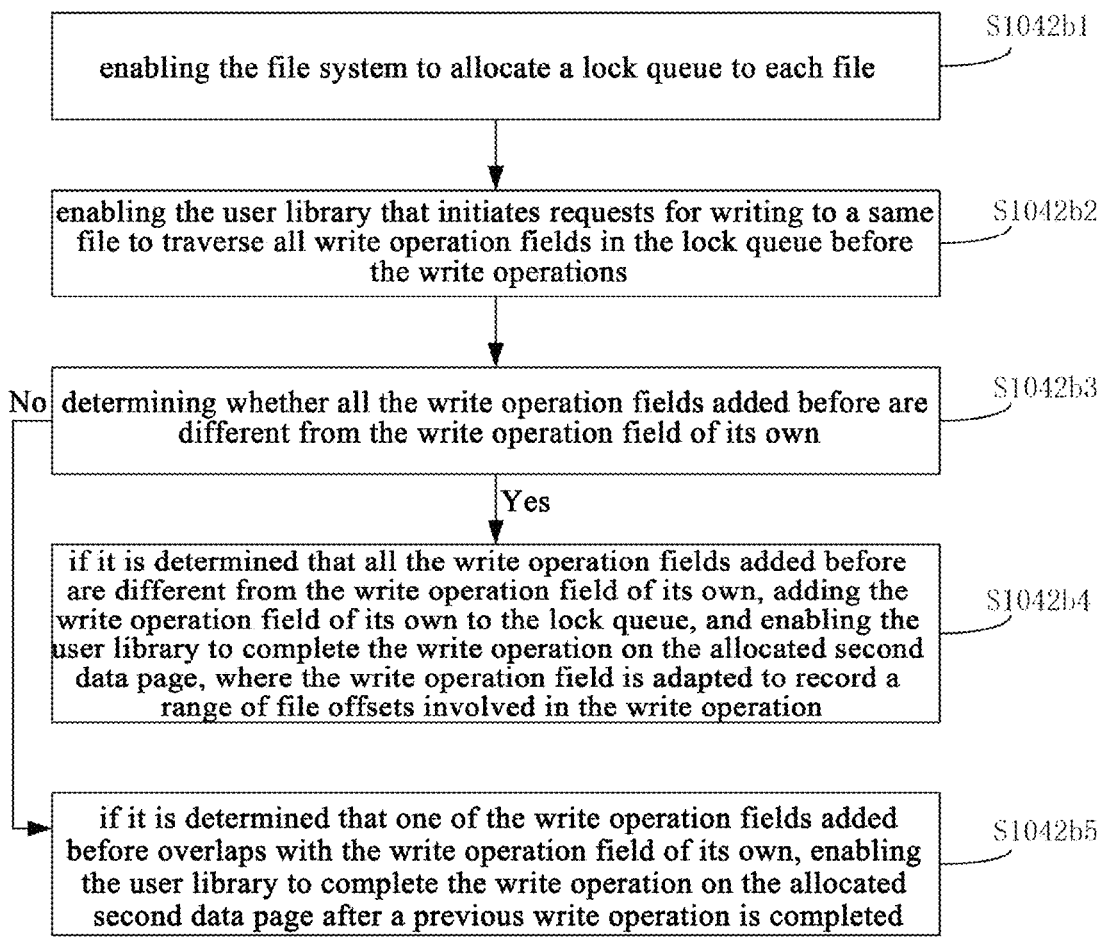
FIG. 9 is a schematic flow chart of still another embodiment of a data storage access method for persistent memory according to the present invention.

Further, referring to FIG. 9, sub-step S1042b may further include:

Sub-step S1042b1: enabling the file system to allocate a lock queue to each opened file;

Sub-step S1042b2: enabling the user library that initiates requests for writing to a same file to traverse all write operation fields in the lock queue before the write operations;

Sub-step S1042b3: determining whether all the write operation fields added before are different from the write operation field of its own;

Sub-step S1042b4: if it is determined that all the write operation fields added before are different from the write operation field of its own, adding the write operation field of its own to the lock queue, and enabling the user library to complete the write operation on the allocated second data page, where the write operation field is adapted to record a range of file offsets involved in the write operation; and Sub-step S1042b5: if it is determined that one of the write operation fields added before overlaps with the write operation field of its own, enabling the user library to complete the write operation on the allocated second data page after a previous write operation is completed.

The file system allocates a lock queue to each opened file. Specifically, the lock queue is defined as a ring buffer. Each user who initiates the requests for writing to the same file needs to add a write operation field to the lock queue before the write operation. This write operation field describes the range of file offsets affected by the write operation. As shown in FIG. 8, the write operation field includes a start address of the write operation (i.e., the file offset field), a size of the written space (i.e., the field of data quantity to be written), and the like. Subsequently, a user who requests for writing to the same file traverses all the write operation fields in the lock queue forwardly when adding the write operation field, and the execution of the write operation can be continued only if it is determined that all the write operation fields added before will not conflict with its own write operation field. If there is an overlap of write operation fields (i.e., write range), the write operation can only be executed after a previous write operation is completed.

When the operation type is a modification operation, step S104 may specifically include: for the modification operation, enabling the user library to send a modification request to the kernel thread, and enabling the kernel thread to perform corresponding modification according to the modification request.

The data of the file system includes indexable structured metadata stored in a dynamic random access memory (DRAM); the data of the file system further includes a log-structured metadata modification history, where the log-structured metadata modification history is used to record related information of the modified metadata and is stored in the persistent memory space.

Figure 10:
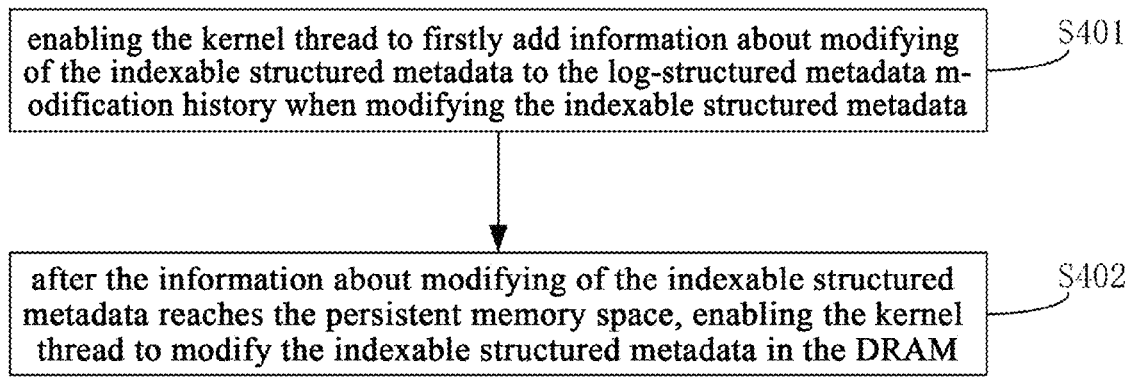
FIG. 10 is a schematic flow chart of still another embodiment of a data storage access method for persistent memory according to the present invention.

The modification operation is to modify the indexable structured metadata. Referring to FIG. 10, the method further includes:

Step S401: enabling the kernel thread to firstly add information about modifying of the indexable structured metadata to the log-structured metadata modification history when modifying the indexable structured metadata. In this way, it is possible to ensure that even in the event of a system failure, the latest status of the file system can be recovered based on the information in the log-structured metadata modification history.

Step S402: after the information about modifying of the indexable structured metadata reaches the persistent memory space, enabling the kernel thread to modify the indexable structured metadata in the DRAM.

Because there is a CPU cache, if the information about modifying only reaches the cache and does not reach the persistent memory space, the information about modifying will still be lost after a power down. It is usually necessary to ensure that the information about modifying indeed reaches the persistent memory space by issuing cache line eviction instruction manually, and thereafter the information about modifying will not be lost even in case of power down.

Since the log-structured metadata modification history needs to be stored persistently in persistent memory, this operation causes a lot of persistence overhead. Considering the performance bottleneck caused by adding the information about modifying of the indexable structured metadata to the log-structured metadata modification history, the kernel thread can, when processing access requests of the modification operations of multiple users, process the access requests of the modification operations of the multiple users in a batch and then return to the multiple users in a batch. Specifically, the kernel thread groups the multiple users, processes the requests of users in the same group in a batch, and then returns to the users in a batch. Specifically, users in the same group share the same request status structure and occupy different bit fields in the structure respectively. When sending requests, each user sets its own bit field to indicate generating of a new message. The kernel thread polls the structure; and after batch processing all user requests, the kernel thread sets request status structure in a batch and returns the results to the users.

In an embodiment, the indexable structured metadata includes namespace metadata and data block index metadata. The namespace metadata is used to manage a namespace of the file system and forms a directory of the file system. The method further includes: enabling the kernel thread to maintain entries of the directory by using a skip list; and enabling the kernel thread to atomically modify node pointers of respective layers of the skip list by using atomic operation.

In order to enable the user library to use the index structure of the directory without locks rather than read inconsistent status when the kernel thread updates the index structure of the directory, the skip list is used in the embodiment to organize the directory entries: that is, entries under the same directory are maintained as a skip list. A node in the skip list represents a directory entry, and nodes in the skip list are sorted according to the hash value of the names of the sub-files. The maintenance of the skip list is the responsibility of the kernel thread. When modifying the skip list, the kernel thread atomically modifies the successor pointers of the nodes of each layer by using atomic operation, which enables the user library to consistently index the skip list without locking. As a specific example, the data block index metadata may adopt a hierarchical index structure similar to Ext2, and is divided into first, second and third levels of indexes.

Figure 11:
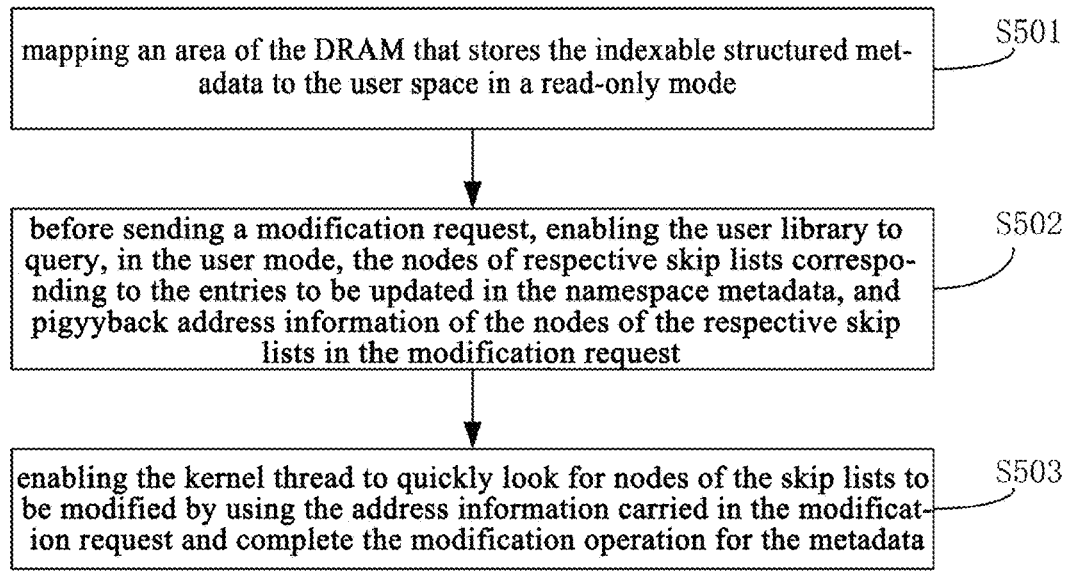
FIG. 11 is a schematic flow chart of still another embodiment of a data storage access method for persistent memory according to the present invention.

Further, referring to FIG. 11, the method further includes:

Step S501: mapping an area of the DRAM that stores the indexable structured metadata to the user space in a read-only mode;

Step S502: before sending a modification request, enabling the user library to query, in the user mode, the nodes of respective skip lists corresponding to the entries to be updated in the namespace metadata, and pigyyback address information of the nodes of the respective skip lists in the modification request; and Step S503: enabling the kernel thread to quickly look for nodes of the skip lists to be modified by using the address information carried in the modification request and complete the modification operation for the metadata.

In this way, the pressure of the kernel thread can be alleviated, and the kernel thread can quickly locate the nodes of the skip lists that need to be modified, and complete the modification operation on the metadata.

Figure 12:
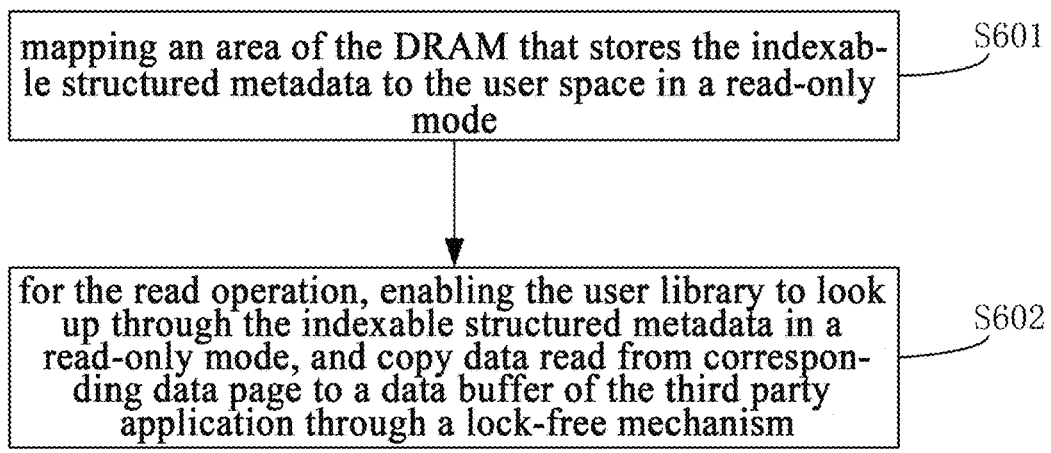
FIG. 12 is a schematic flowchart diagram of still another embodiment of a data storage access method for persistent memory according to the present invention.

In an embodiment, the data of the file system includes indexable structured metadata, and the indexable structured metadata is stored in the dynamic random access memory (DRAM); see FIG. 12, the method further includes:

Step S601: mapping an area of the DRAM that stores the indexable structured metadata to the user space in a read-only mode; and Step S602: for the read operation, enabling the user library to look up through the indexable structured metadata in a read-only mode, and copy data read from corresponding data page to a data buffer of the third party application through a lock-free mechanism.

In this embodiment, in order to implement data read in a lock-free mechanism, version information is added in each index entry in the data block index metadata by means of bit field multiplexing. When updating the data block index, the version information of the corresponding index entry is updated at the same time. By checking the version information, the reading user can recognize the inconsistent status and re-execute the read operation to ensure data consistency. After determining that the version information is consistent, the data block index metadata is used to find the location of each data page, and then the data page is accessed to copy the data to be read by the user into the data buffer of the user's third-party application.

A lock is not needed in the lock-free mechanism, which enables the read operation to be performed faster, avoids the bottleneck caused by the lock-unlock operation and lock competition in the multi-core environment, and effectively improves the system scalability.

Figure 13:
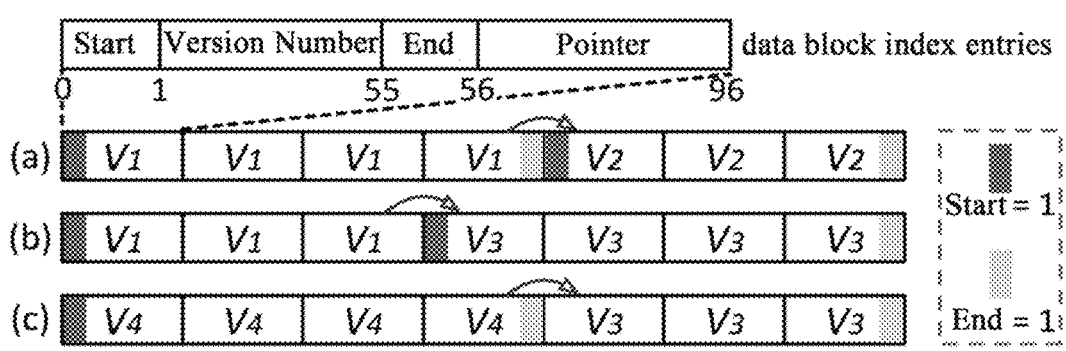
FIG. 13 is a schematic diagram of an embodiment of a lock-free mechanism in a data storage access method for persistent memory of the present invention.

FIG. 13 shows a schematic diagram of the lock-free mechanism. The version information is added in each index entry in the data block index metadata by means of bit field multiplexing. The structure of each index entry, shown in FIG. 13, includes four fields, namely: start flag (corresponding to Start in the drawing), version number, end flag (corresponding to End in the drawing), a pointer structure (corresponding to Pointer in the drawing). The start flag is used to mark whether the index entry is the first index entry modified in the write operation for modifying the index entry. The version number is used to record the version number of the user when the index entry is modified. The end tag is used to mark whether the index entry is the last entry modified in the write operation for modifying the index entry. The pointer structure points to the data page or the lower layer index structure. The version information is added by the kernel thread when updating the index entry and the version number in the index entry modified by the same write operation is the same. When the user library indexes the index entry, it can be identified whether the index entries are in an inconsistent status by checking the version numbers of the different index entries and the difference of the identifiers. If the version information is consistent, the read operation can be continued; and if inconsistent, the read operation needs to be re-executed until a consistent status is read.

As a specific example, the four lock-free mechanisms in the embodiments of the present invention will be explained below with reference to FIG. 13. Taking a write operation that modifies three index entries as an example, the start flag of the first index entry in the three index entries and the end flag of the third index entry in the three index entries are set. A read operation can determine whether there is a consistent status by checking whether it is one the following three conditions in which:

(1) An index entry with the same version number is between an entry with a set start flag and an entry with a set end flag; in this case the write operation has completed the update of the index entry and will not lead to a different status.

(2) When the version number is incremented, the read operation sees an index entry with the set start flag, indicating that a write operation has overwritten the latter half of the index entry updated by a previous write operation, which will not lead to a different status.

(3) The read operation sees an index entry with the set end flag before seeing a decrease of the version number, indicating that a write operation has overwritten the first half of the index entry updated by a previous write operation, which will not lead to a different status.

If the read operation encounters a condition other than the above three conditions, it indicates that the read operation has seen an inconsistent status. The read operation needs to be entered by re-collecting the index entry. The retry for the read operation may occur multiple times until the read operation reads a consistent status.

Figure 14:
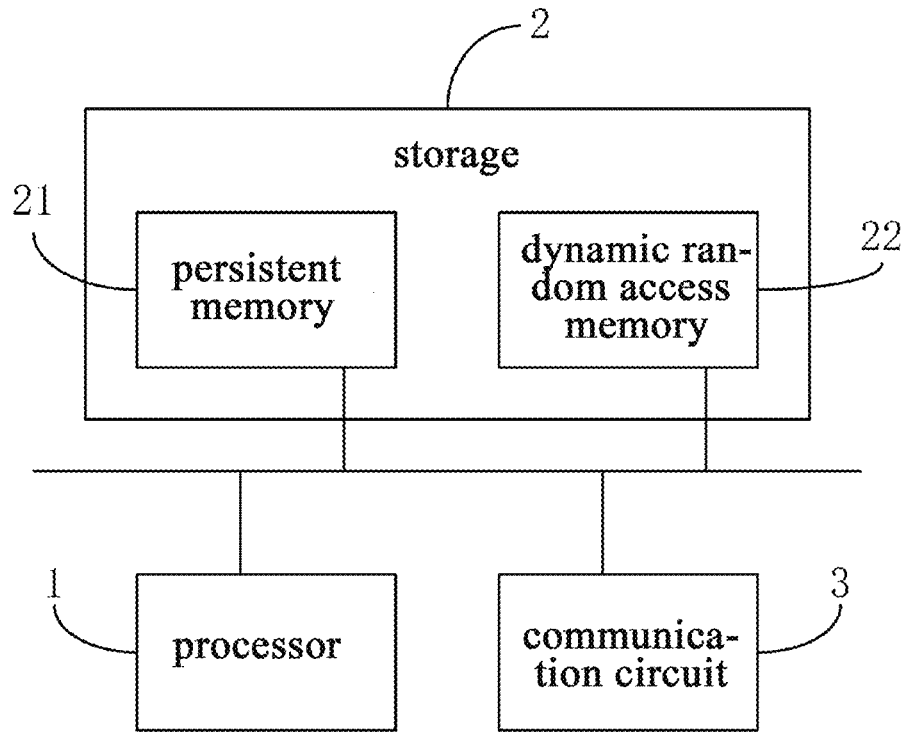
FIG. 14 is a schematic structural diagram of an embodiment of a data storage access device for persistent memory of the present invention.

Referring to FIG. 14, FIG. 14 is a schematic structural diagram of an embodiment of a data storage access device for persistent memory according to the present invention. The device includes: a processor 1, a storage 2, and a communication circuit 3. The processor 1 is coupled to the storage 2 and the communication circuit 3. The storage 2 includes a persistent memory 21 and a dynamic random access memory 22. The processor 1, the storage 2, and the communication circuit 3, when in operation, are capable of implementing the steps in any of the above methods. For details of the related content, please refer to the above methods, which will not be described herein.

Figure 15:
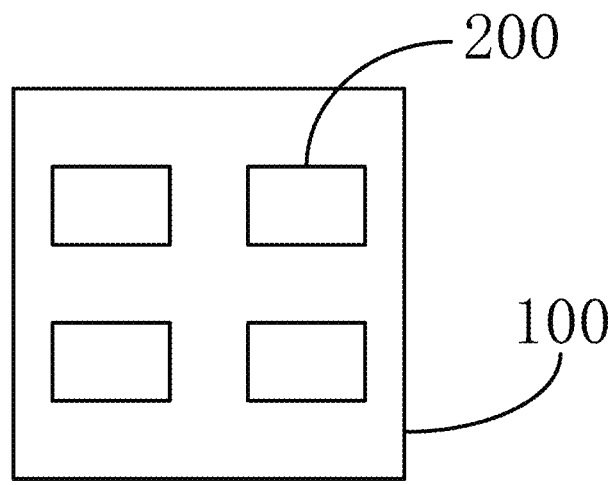
FIG. 15 is a structural diagram of an embodiment of an apparatus with storage function according to the present invention.

Referring to FIG. 15, FIG. 15 is a schematic structural diagram of an embodiment of an apparatus with storage function. The apparatus 100 stores program data 200. When being executed by a processor, the program data 200 implements the steps in any of the above methods. For details of the related content, please refer to the above methods, which will not be described herein.

It is to be noted that terms of "comprise", "include" or any other variants are intended to be non-exclusive. Therefore, a process, method, article or system including a plurality of elements includes not only the elements but also other elements that are not enumerated, or also include the elements inherent for the process, method, article or system. Unless expressively limited otherwise, the statement "comprising (including) one . . . " does not exclude the case that other similar elements may exist in the process, method, article or system.

Serial numbers of the embodiments are only for illustration, merits of the embodiments may not be reflected by the serial numbers.

By the foregoing description of the embodiments, those skilled in the art may understand clearly that the present disclosure may be implemented via software and necessary hardware platform, or via the hardware only; in most cases, the former is preferable. In view of this, all or part of the embodiments of the disclosure may be implemented by software product, where the software product may be stored in readable storage medium (such as ROM/RAM, disk or optical disk), and multiple instructions are included in the software product to enable a terminal device (mobile phone, computer, server, air conditioner or network device) to implement the method provided according to each embodiment of the disclosure.

The above are only the preferred embodiments of the present invention, and are not intended to limit the scope of the invention. Equivalent structure or equivalent process transformations made by using the description and the drawings of the present invention, or direct or indirect applications in other related technical fields, fall in the scope of the present invention similarly.

What is claimed is:

1. A data storage access method for persistent memory, comprising:
    enabling a file system in a device to receive, in a kernel space, an access request of a user library, wherein the user library operates in a user mode, and the access request is initiated by a third-party application through the user library and carries an operation type;
    if the operation type is read operation, enabling the file system to allow the third-party application to directly access a persistent memory space of the device through the user library; and
    if the operation type is not read operation, enabling the file system to allow the third-party application to access the persistent memory space of the device through the user library and a kernel thread, wherein the kernel thread operates in a kernel mode,
    wherein the user library communicates with the kernel thread through a shared message pool; the shared message pool is a shared memory area for messages which is used by the user library and the kernel thread in common,
    the method further comprises:
        enabling a plurality of the user libraries to send a plurality of different access requests to the kernel thread through the shared message pool;
        enabling the kernel thread to process the plurality of different access requests in a batch, and adding a log-structured metadata modification history in a batch, wherein the log-structured metadata modification history is adapted to record information related to modified metadata and is stored in the persistent memory space; and
        after processing the plurality of different access requests, enabling the kernel thread to return processing results to the user libraries through the shared message pool in a batch;
    wherein if the operation type is not read operation, the enabling the file system to allow the third party application to access the persistent memory space of the device through the user library and the kernel thread comprises:
        for a modification operation, enabling the user library to send a modification request to the kernel thread, and enabling the kernel thread to perform corresponding modification according to the modification request;
    wherein data of the file system comprises indexable structured metadata being stored in a dynamic random access memory DRAM; data of the file system further comprises a log-structured metadata modification history, wherein the log-structured metadata modification history is used to record related information of modified metadata and is stored in the persistent memory space;
    the modification operation is to modify the indexable structured metadata, and the method further comprises:
        enabling the kernel thread to firstly add information about modifying of the indexable structured metadata to the log-structured metadata modification history when modifying the indexable structured metadata; and
        after the information about modifying of the indexable structured metadata reaches the persistent memory space, enabling the kernel thread to modify the indexable structured metadata in the DRAM.

2. The method according to claim 1, wherein prior to enabling the file system in the device to receive, in the kernel space, the access request of the user library, the method comprises:
    mapping the persistent memory space of the device to the user space in a read-only mode.

3. The method according to claim 2, wherein if the operation type is read operation, the enabling the file system to allow the third-party application to directly access persistent memory space of the device through the user library comprises:
    for the read operation, enabling the file system to allow the third-party application to directly index a file system image in the user space through the user library.

4. The method according to claim 1, wherein the method further comprises:
    enabling the user libraries to apply message areas for their processes in the shared message pool during initialization, wherein message areas for different processes are isolated from each other, and each process is only allowed to access the message area of its own;
    enabling the user libraries to copy new messages to the message areas and set request status fields to validate the new messages;

enabling the kernel thread to identify the validated new messages in a polling manner;

enabling the kernel thread to copy corresponding return information to the message areas and set message return values after finishing processing of the validated new messages; and enabling the user libraries to query the message return values in a polling manner to obtain the return information.

5. The method according to claim 1, wherein the operation type that is not read operation is at least one of write operation and modification operation.

6. The method according to claim 5, wherein if the operation type is not read operation, the enabling the file system to allow the third party application to access the persistent memory space of the device through the user library and the kernel thread comprises:

for the write operation, enabling the kernel thread to set a first page entry of a page table in the kernel space to make a corresponding first data page writable, wherein the first data page is a memory area of fixed size in the persistent memory space;

enabling the user library to complete the write operation on the first data page; and enabling the kernel thread to reset the first page entry to make the first data page read-only.

7. The method according to claim 5, wherein the method further comprises:

enabling the kernel thread to reserve a second data page for the user library in a batch and set an associated second page entry to make the second data page writable, wherein the second data page is a memory area of fixed size in the persistent memory space;

wherein, if the operation type is not read operation, the enabling the file system to allow the third party application to access the persistent memory space of the device through the user library and the kernel thread comprises:

for the write operation, enabling the user library to directly perform allocation in the reserved second data page and obtain a corresponding range lock directly in the user space;

enabling the user library to complete the write operation on the allocated second data page; and enabling the kernel thread to reset the second page entry of the newly written second data page as read-only and release the range lock.

8. The method according to claim 7, wherein the range lock is capable of supporting concurrent write operations in a same file;

the enabling the user library to complete the write operation on the allocated second data page comprises:

enabling the file system to allocate a lock queue to each opened file;

enabling the user library that initiates requests for writing to a same file to traverse all write operation fields in the lock queue before the write operations;

if it is determined that all the write operation fields added before are different from the write operation field of its own, adding the write operation field of its own to the lock queue, and enabling the user library to complete the write operation on the allocated second data page, wherein the write operation field is adapted to record a range of file offsets involved in the write operation; and if it is determined that one of the write operation fields added before overlaps with the write operation field of its own, enabling the user library to complete the write operation on the allocated second data page after a previous write operation is completed.

9. The method according to claim 1, wherein the indexable structured metadata comprises namespace metadata and data block index metadata, the namespace metadata is used to manage a namespace of the file system and forms a directory of the file system;

the method further comprises:

enabling the kernel thread to maintain entries of the directory by using a skip list; and enabling the kernel thread to atomically modify node pointers of respective layers of the skip list by using atomic operation.

10. The method according to claim 9, wherein the method further comprises:

mapping an area of the DRAM that stores the indexable structured metadata to the user space in a read-only mode;

before sending a modification request, enabling the user library to query, in the user mode, the nodes of respective skip lists corresponding to the entries to be updated in the namespace metadata, and carry address information of the nodes of the respective skip lists in the modification request; and enabling the kernel thread to quickly look for nodes of the skip lists to be modified by using the address information carried in the modification request and complete the modification operation on the metadata.

11. The method according to claim 1, wherein metadata of the file system comprises indexable structured metadata, and the indexable structured metadata is stored in a dynamic random access memory DRAM;

the method further comprises:

mapping an area of the DRAM that stores the indexable structured metadata to the user space in a read-only mode;

for the read operation, enabling the user library to look up through the indexable structured metadata in a read-only mode, and copy data read from corresponding data page to a data buffer of the third party application through a lock-free mechanism.

12. A data storage access device for persistent memory, comprising:

a processor, a storage, and a communication circuit, wherein:

the processor is coupled to the storage and the communication circuit, the storage comprises a persistent memory and a dynamic random access memory, and the processor, the memory and the communication circuit are capable of implementing steps of the method according to claim 1 while in operation.

13. An apparatus with storage function on which program data is stored, wherein the program data, when being executed by a processor, implements steps of the method according to claim 1.

* * * * *